US008627593B1

(12) United States Patent
Schepp et al.

(10) Patent No.: US 8,627,593 B1
(45) Date of Patent: Jan. 14, 2014

(54) REMOTE CONTROLLED FISHING LINE BOBBER

(75) Inventors: Jeff Schepp, Cape Coral, FL (US); Ron Sargent, Fort Lauderdale, FL (US)

(73) Assignee: Jeff Schepp, Cape Coral, FL (US)

( * ) Notice: Subject to any disclaimer, the term of this patent is extended or adjusted under 35 U.S.C. 154(b) by 157 days.

(21) Appl. No.: 13/448,601

(22) Filed: Apr. 17, 2012

Related U.S. Application Data

(63) Continuation-in-part of application No. 12/315,585, filed on Dec. 4, 2008, now abandoned.

(51) Int. Cl.
*A01K 93/00* (2006.01)

(52) U.S. Cl.
USPC .............................................. 43/26.1; 440/6

(58) Field of Classification Search
USPC ............... 43/26.1, 43.1, 44.87; 446/158, 159, 446/163–165, 33, 153–156, 161, 162; 114/25, 245, 332, 315, 337; 367/130; 440/6
See application file for complete search history.

(56) References Cited

U.S. PATENT DOCUMENTS

| 2,827,731 | A | * | 3/1958 | Haynes | 43/43.14 |
| 6,152,791 | A | * | 11/2000 | Sinko et al. | 440/6 |
| 6,263,611 | B1 | * | 7/2001 | Kimura | 43/26.1 |
| 6,729,931 | B2 | * | 5/2004 | Lee | 446/160 |
| 6,760,995 | B2 | * | 7/2004 | Mueller | 43/26.2 |

* cited by examiner

*Primary Examiner* — Kimberly Berona
*Assistant Examiner* — Danielle Clerkley
(74) *Attorney, Agent, or Firm* — William E. Noonan

(57) ABSTRACT

A remote controlled fishing line bobber includes an elongate bobber shell floatable in a body of water and defining an interior compartment. An elongate connecting rod extends generally axially through the bobber shell from a leading end to a trailing end of the shell portion. The connecting rod includes a pair of attachment components disposed proximate respective ends of the rod and exteriorly of the shell for attaching the rod to respective segments of fishing line. A battery powered propulsion device is mounted to the lower shell portion. A receiving unit mounted on the compartment senses wireless propulsion signals transmitted by a remote control unit and a controller directs the propulsion device to drive the bobber through the water in accordance with the transmitted signals.

15 Claims, 17 Drawing Sheets

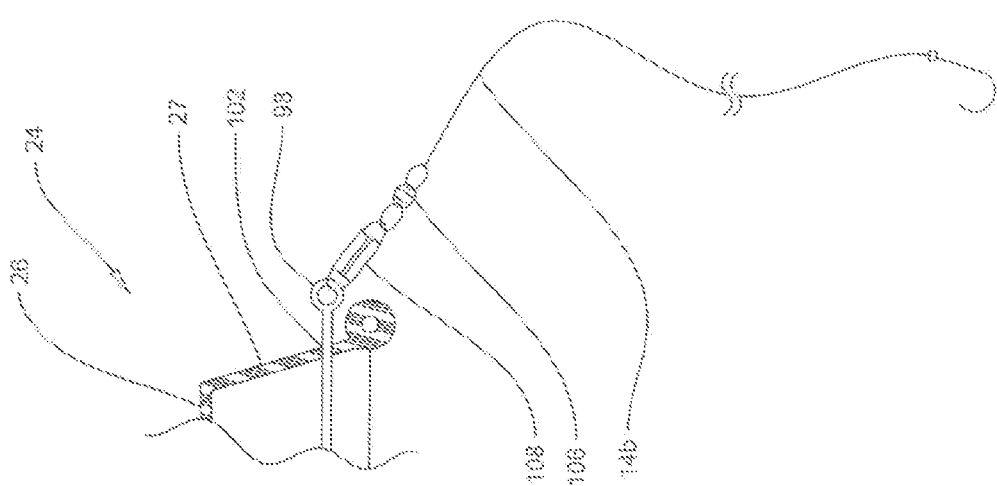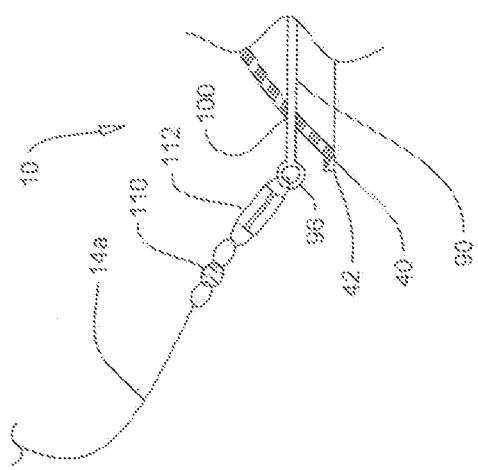
Fig. 6

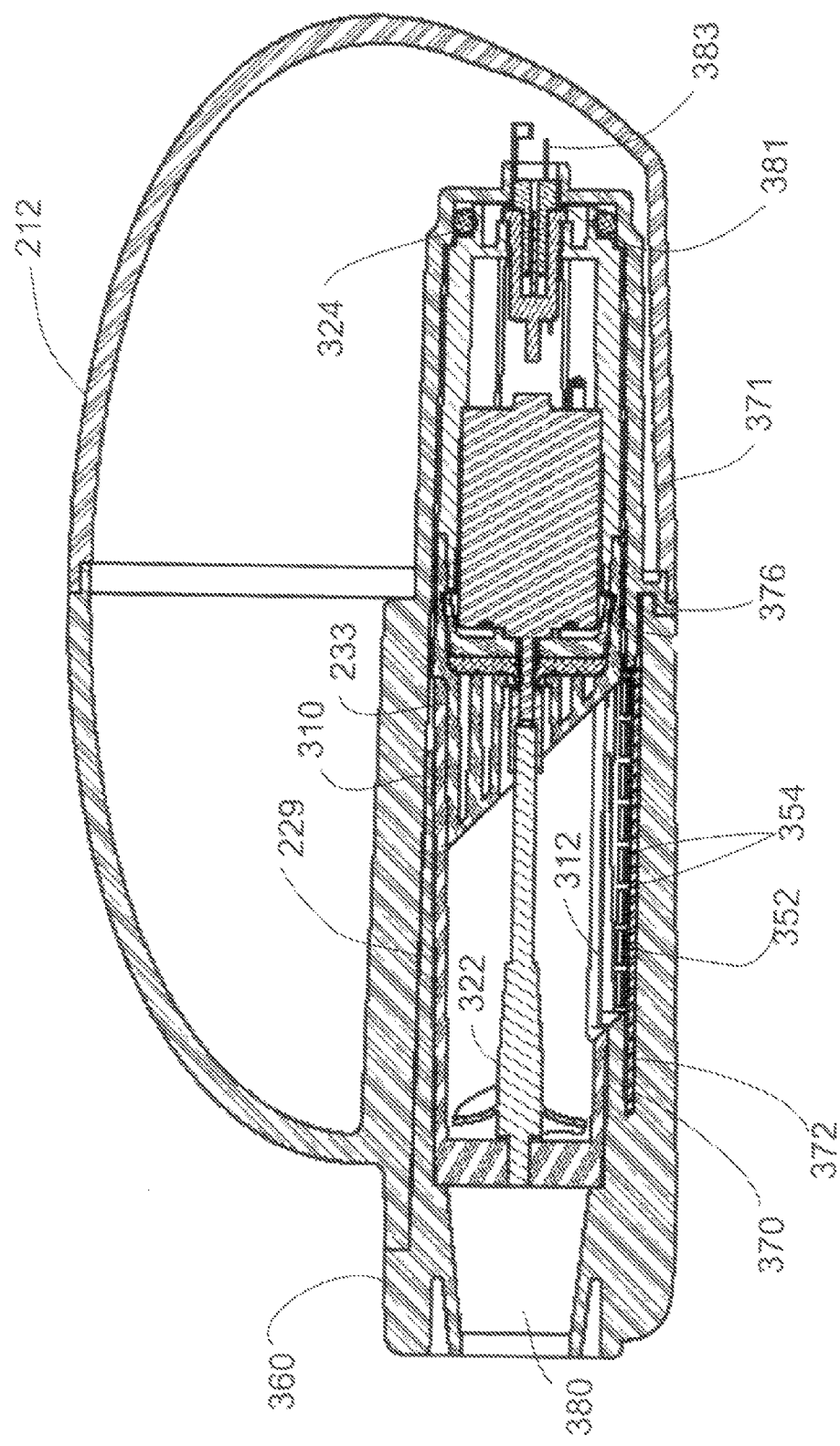

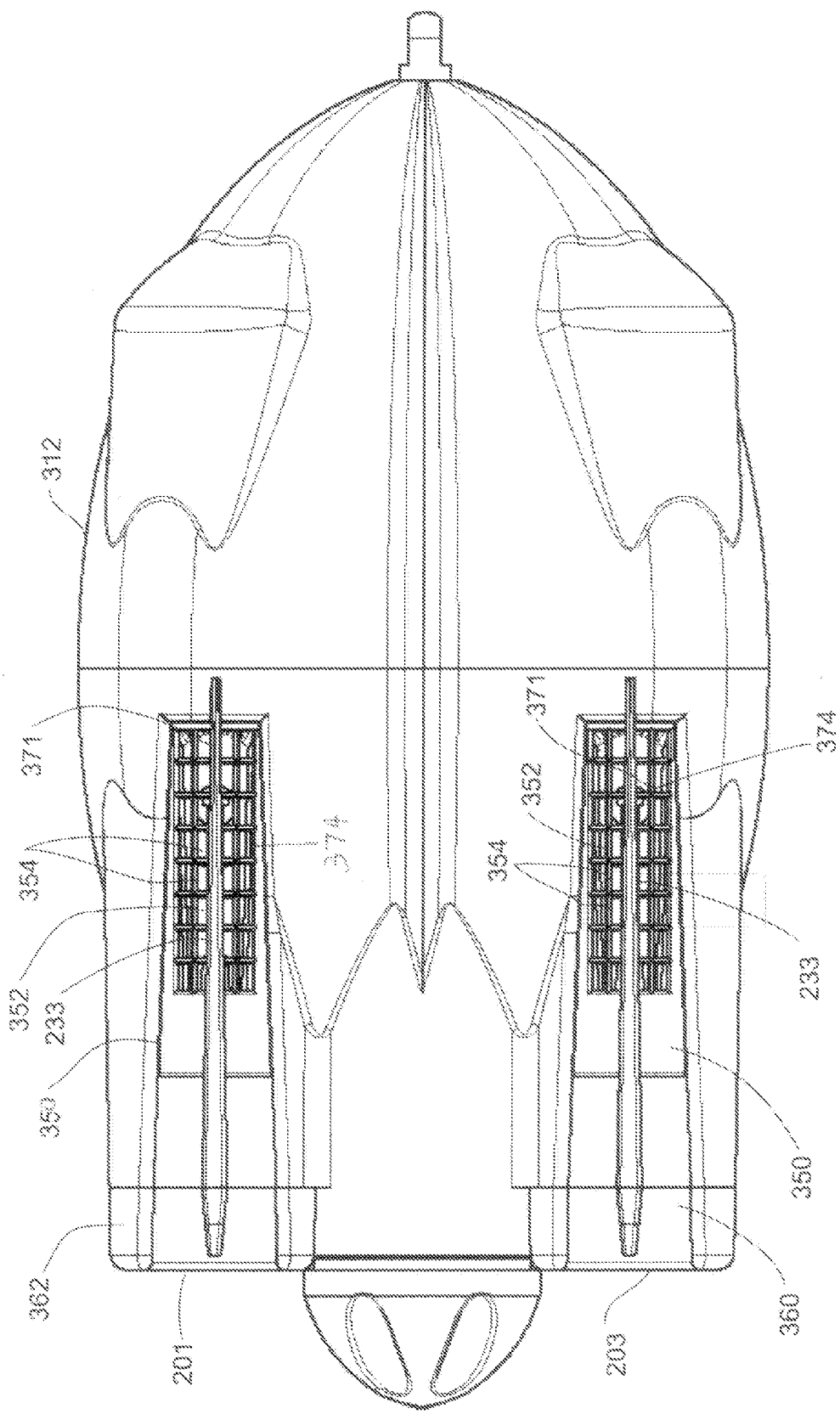

REMOTE CONTROLLED FISHING LINE BOBBER

RELATED APPLICATION

This application is a continuation in part of U.S. patent application Ser. No. 12/315,585 filed Dec. 4, 2008 now abandoned.

FIELD OF THE INVENTION

This invention relates to a remote controlled fishing line bobber and, more particularly, to a hydrodynamically streamlined bobber that is remotely controlled to deliver a suspended fish hook, bait and other fishing tackle components to a desired target area so that improved fishing is achieved.

BACKGROUND OF THE INVENTION

Fishermen commonly attach a variety of floats or bobbers to their fishing line. Such devices serve a number of purposes. For example, the bobber holds the suspended hook and the remainder of the rig or tackle above the bottom of the pond, lake or other body of water being fished. This helps to keep the rig and fishing line itself from becoming entangled in vegetation or debris littering the bottom. The bobber also clearly marks the area being fished. This helps the fisherman to maintain the hook and bait in a desired target area. In addition, the bobber serves to clearly and unmistakably indicate when a fish has struck the hook. This typically occurs when the floating bobber is pulled suddenly below the surface of the water.

Typically, a fishing rod is cast to locate the hook and bait in a selected target area for fishing. The bobber then floats at least for a while in that area. Over time, currents, ripples or other water movement tend to displace the bobber and the suspended fishing line and hook from the target area. The bobber can drift far outside of the target area even after a fairly brief interval. To return the hook and bait to the target area, the line must be recast. Repeated recasting may be required. This can be time consuming, tedious and is apt to scare fish away. An easier and improved technique for maintaining the hook and bait in a desired fishing target area is definitely needed.

Additional problems result from the manner in which most conventional bobbers are attached to the fishing line. Typically, the bobber clamps onto or pinches the line. This can gradually fray the fishing line. Tangling of the line can also result, particularly as the bobber drifts about in the body of water.

Various remote controlled fishing bobbers have been developed. See Barra et al., U.S. Pat. No. 5,086,581 and Temes, United States Publication No. 20050102883. These devices feature fairly complex and difficult to assemble constructions. In addition, these bobbers utilize fairly conventional upright bobber configurations. They are not streamlined and are apt to become tangled with the line. Fraying of the line also remains a problem. Neither utilizes a streamlined, boat-like shape for facilitating movement through debris in the water.

Various bait delivery systems have also been utilized. See James, U.S. Pat. No. 5,806,232 and Hannam, U.S. Pat. No. 4,856,222. In these devices, a motorized boat shaped device delivers a fishing line and bait to a selected spot. When a fish strikes the bait, the fishing line is detached from the vessel. The vessel does not "bob" to indicate that a fish has struck the hook. Conventional bait delivery systems are not operably connected between the fishing rod and the hook and do not comprise a part of the fishing tackle package. They certainly cannot be retrieved with a fish when the fish is hooked and reeled in by the fishermen.

Conventional remote controlled fishing bobbers also exhibit fairly poor durability and longevity. These devices are quite susceptible to water intrusion, which can prematurely damage and destroy the electronic controls and drive mechanisms. Use of these products in corrosive salt water is especially problematic. No known remote control bobbers control employ conveniently replaceable electronic controls and drive components or structure that permits ready replacement of such parts

SUMMARY OF THE INVENTION

It is therefore an object of the present invention to provide a remote controlled fishing bobber that allows a fishing line and attached hook to be maintained in a target fishing area without having to repeatedly and tediously recast the line.

It is a further object of this invention to provide a remote controlled fishing bobber utilizing a sleek and streamlined boat-like shape that presents an aesthetically pleasing and whimsical appearance and exhibits smooth, streamlined and tangle-free movement through the body of water being fished.

It is a further object of this invention to provide a remote controlled fishing bobber that is secured to the fishing line in an improved manner that avoids entanglement with the line, reduces fraying of the line and maintains the strength and structural integrity of the bobber.

It is a further object of this invention to provide a remote controlled fishing bobber that is self-righting and maintains an effective floating position in a body of water so that the location of a supported fishing line and hook are dependably and accurately marked.

It is a further object of this invention to provide a remote controlled fishing bobber that operates reliably and is effectively sealed to avoid water intrusion into the electronic components of the bobber.

It is a further object of this invention to provide a remote controlled fishing bobber is secured to the line in a unique manner that allows the bobber to move freely without entanglement with either the line or surrounding vegetation/debris in the water.

It is a further object of this invention to provide a remote controlled fishing bobber that is stronger and more rugged and durable than conventional passive or electronically controlled bobbers and that better resists potentially destructive pulling forces that often accompany a fish strike.

It is a further object of this invention to provide a remote controlled fishing bobber that exhibits significantly less drag than existing bobbers and which is therefore particularly effective for being driven through the water by wireless remote control means.

It is a further object of this invention to provide a remote controlled fishing bobber that avoids repeated recasting of the fishing line and which is far less disruptive to fish in an area being fished.

It is a further object of this invention to provide a remote controlled fishing bobber using electronic controls and jet drive propulsion units, which permit reliable and versatile directional control and operation of the bobber and which are effectively sealed to provide extended service life.

It is a further object of this invention to provide a remote controlled fishing bobber utilizing a control unit and jet drive units that are conveniently replaceable such that the bobber is not prematurely destroyed and does not have to be entirely replaced due to water intrusion and damage.

It is a further object of this invention to provide a remote controlled bobber employing a versatile, hydrodynamically streamlined design that allows bait to be presented from both leading and trailing ends of the bobber.

It is a further object of this invention to provide a remote controlled bobber utilizing a hydrodynamically streamlined configuration at both ends that permits the bobber to be effectively retrieved when a fish strikes the hook regardless of which end of the bobber is directly secured to the hook.

It is a further object of this invention to provide a remote controlled bobber employing an innovative lighting arrangement that both illuminates the bobber in the dark and effectively attracts fish.

It is a further object of this invention to provide a remote controlled bobber, which employs separate internal compartments and receptacles for control and propulsion components, as well as a system for effectively securing those interior compartments and receptacles in a closed, locked and sealed condition so that potentially damaging water intrusion is avoided, and which also allows for convenient access to the compartments and receptacles as needed to remove and replace the control can propulsion components.

This invention features a remote controlled fishing bobber including an elongate bobber shell floatable in a body of water and having an interior compartment. An elongate connecting rod is mounted to the bobber shell and extends longitudinally therethrough from a leading end to a trailing end of the shell. The connecting rod includes a pair of attachment components arranged proximate respective ends of the rod and exteriorly of the shell for attaching the rod to respective segments of fishing line. A battery powered propulsion device is mounted to the lower shell portion. Means are mounted in the compartment for receiving wireless propulsion signals transmitted from a remote control unit and directing the propulsion device to drive the bobber through the water in accordance with the transmitted signals.

In a preferred embodiment, the propulsion device includes at least one, and preferably two replaceable jet drive units. Each such unit is removably received in a respective receptacle formed longitudinally through the lower half portion of the bobber shell.

The connecting rod may extend through aligned orifices formed respectively in the leading and trailing ends of the upper shell portion. The attachment components are preferably larger than the orifices to restrict passage of the attachment components through the orifices. The attachment components may include respective eyelets or holes for tying to a pair of discrete segments of fishing line that are themselves interconnected to one another by the connecting rod only.

The shell may have a streamlined shape extending from the leading end to the trailing end. Typically the shell includes a boat-like configuration. The bobber may include a center of mass located in the lower shell portion. The propulsion device and the means for receiving and directing are typically mounted in the lower shell portion. The bobber may include a center of mass disposed below the connecting rod such that when the bobber is floated in a body of water, the connecting rod automatically assumes a substantially horizontal orientation.

The propulsion device may include a motor and an impeller operated by the motor. The means for receiving and directing may include a receiver for sensing a signal representative of a selected speed transmitted by the remote control unit and a speed controller for directing the motor to operate the propeller to drive the bobber at a corresponding speed through the body of water. A directional control device may also be mounted in the lower shell section. Means may be mounted in the compartment for receiving wireless directional signals transmitted from the remote control unit and operating the directional control unit to steer the bobber through a body of water in accordance with the transmitted directional signals. The directional control device may include a steering nozzle. Signal receivers may be integrated with the motor controller and directional controller respectively.

At least one swivel device may be used to interconnect a respective attachment component to an associated fishing line segment. Such swivels, along with the low center of mass, enables the shell to be self-righting so that it automatically rights itself into a substantially axially horizontal orientation as it moves through the water or is disrupted such as by a fish strike or otherwise.

The jet drive unit may include a propeller and a motor for selectively operating the propeller in response to signals from the means for receiving and directing. The jet drive unit may further include a housing for enclosing the motor and propeller. The housing may have a water inlet and a water discharge port for transmitting water through the jet drive unit in response to operation of the propeller. An inlet screen may be engaged with the jet drive unit for transmitting water through the inlet and restricting fishing line and debris from entering the jet drive unit through the inlet. A jet drive mounting cover may hold the jet drive unit within the jet drive receptacle and retain the screen over the inlet of the jet drive unit. Typically, a pair of jet drive units are removably and replaceably received in respective, substantially parallel elongate jet drive receptacles formed longitudinally through the lower half portion of the shell. The means for receiving and directing may selectively operate the parallel jet drive units at different speeds (e.g. with one jet drive unit activated and the other deactivated) to turn the apparatus in the water.

The means for receiving and directing may include an electronic control unit removably and replaceably received in a control unit receptacle formed within an upper half portion of the interior compartment of the shell. A control unit closure may be sealably engageable with the shell to cover the control unit receptacle. The closure is selectively disengaged from the shell to open the control unit receptacle and permit selective installation, removal and replacement of the control unit. A light unit may be operably mounted within the control unit receptacle and connected to the control unit. The light unit is selectively activated in response to corresponding control signals from the control unit. The control unit closure may include a window for transmitting light from the light unit therethrough to selectively illuminate the bobber apparatus and attract fish.

A battery compartment may be formed longitudinally through the shell for accommodating a battery therein, which battery supplies power to the propulsion device and the control unit. A plug may be sealably and removably interengaged with the battery compartment. The plug is removed from the battery compartment to selectively install, remove and replace the battery.

A locking component may be interposed between the plug and the shell for locking the control unit closure in a closed condition and holding the jet drive mounting cover and jet drive unit within the jet drive receptacle when the plug is sealably engaged with the battery compartment. More particularly, the locking component may include a detent for releasably engaging a corresponding locking slot in the control unit closure to lock the closure in a closed condition against the control unit receptacle. The locking component may further include a locking tab for engaging a corresponding recess in the jet drive mounting cover to retain the cover and the jet drive unit within the jet drive receptacle.

Typically, the shell is completely opaque such that viewing of the interior compartment through the shell is blocked.

DETAILED DESCRIPTION OF PREFERRED EMBODIMENTS

Other objects, features and advantages will occur from the following description of a preferred embodiment and the accompanying drawings, in which:

FIG. 6 is an elevational, cross sectional and fragmentary view of the upper shell portion and engaged rod and attached swivels interconnecting two discrete segments of the fishing line;

FIG. 15 is a cross sectional view of the jet drive unit as installed in the bobber shell;

FIG. 18 is a bottom plan view of the bobber of FIG. 7, particularly depicting the parallel jet drive propulsion units.

Figure 1:
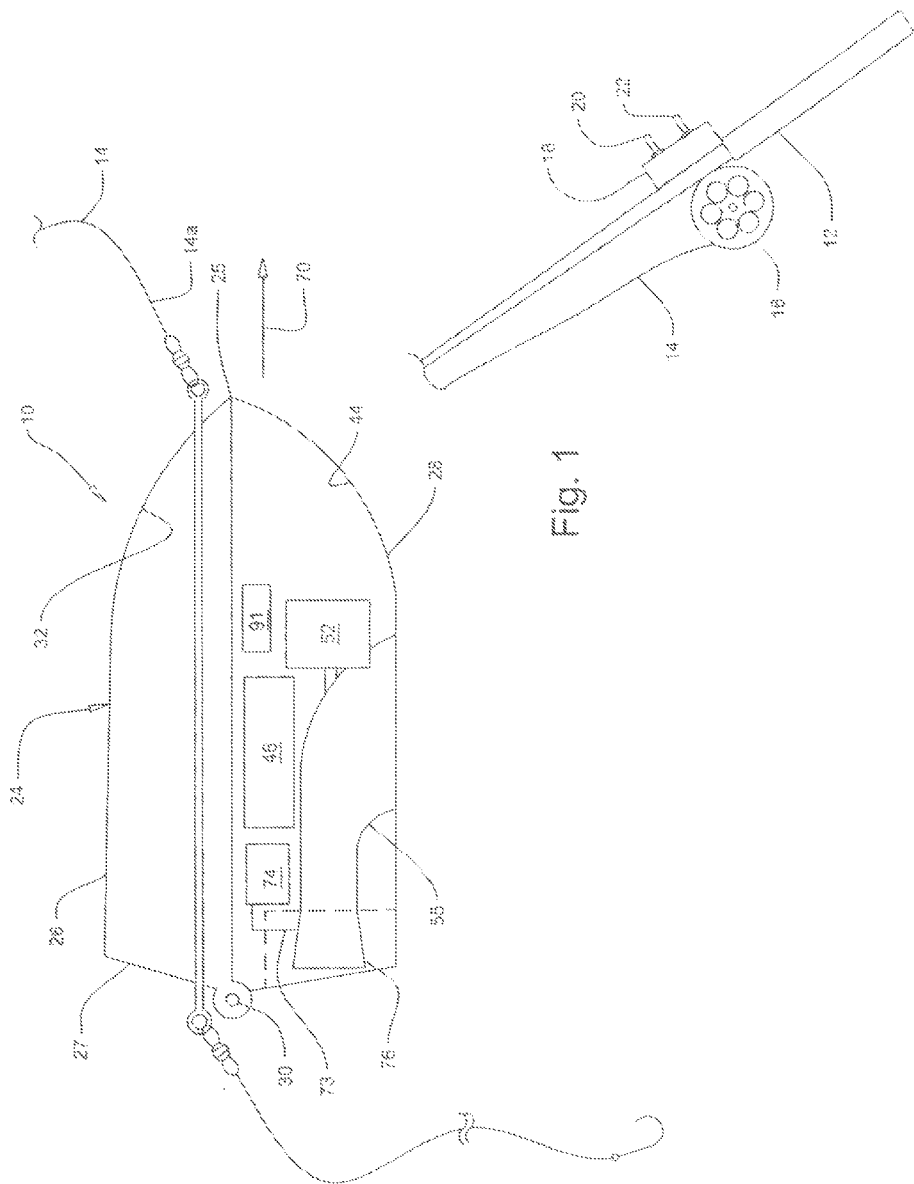
FIG. 1 is an elevational, partly schematic and partly fragmentary view of the remote controlled bobber of this invention and a fishing rod equipped with a remote control unit for operating the bobber.

There is shown in FIG. 1 a remote controlled bobber 10 for use as part of a fishing tackle package. In particular, bobber 10 is used with a fishing rod 12. Conventional nylon fishing line 14 extends from a reel 16 mounted to the rod in a standard fashion. Bobber 10 is interconnected between separate and discrete segments of fishing line 14a and 14b. Line segment 14b may comprise a leader to which a hook 17 is attached. Various types of lures, baits, weights, etc. (which are not shown) may be attached to the line segment 14b in a known manner. Bobber 10 is shown floating on a body of water W. It serves as the float or bobber for the fishing apparatus and particularly operates in a manner described more fully below.

Fishing rod 12 also carries a remote control transmitter unit 18 having a propulsion control lever 20 and a directional control lever 22. Unit 18 transmits radio or other wireless signals that are received by the electronic components of bobber 10 so that the bobber is directed to move in a selected manner through water W. Once again, this operation is described more fully below.

Figure 3:
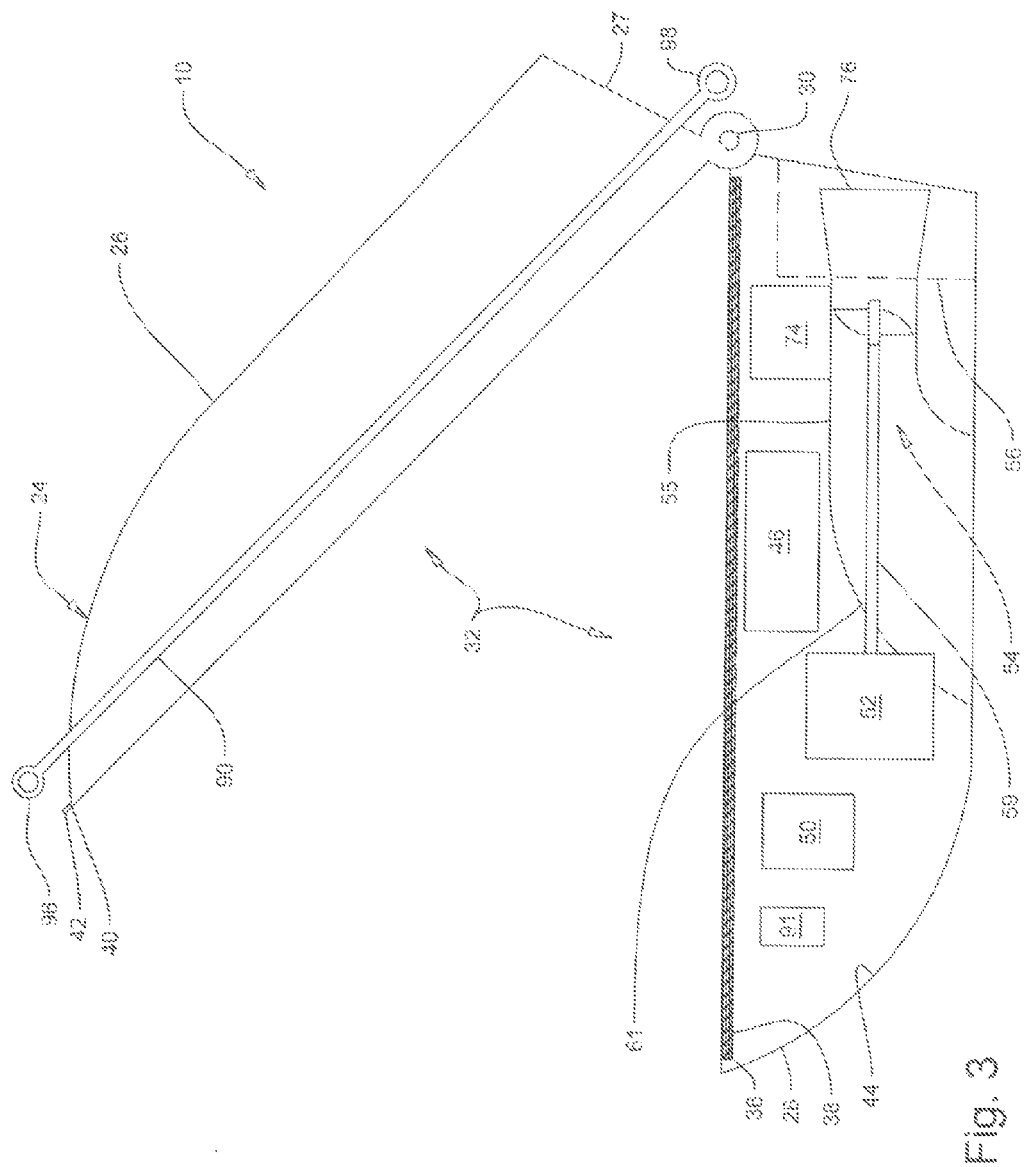
FIG. 3 is a side elevational view similar to that of FIG. 2 of the bobber with the bobber shell in a partially opened condition.
Figure 4:
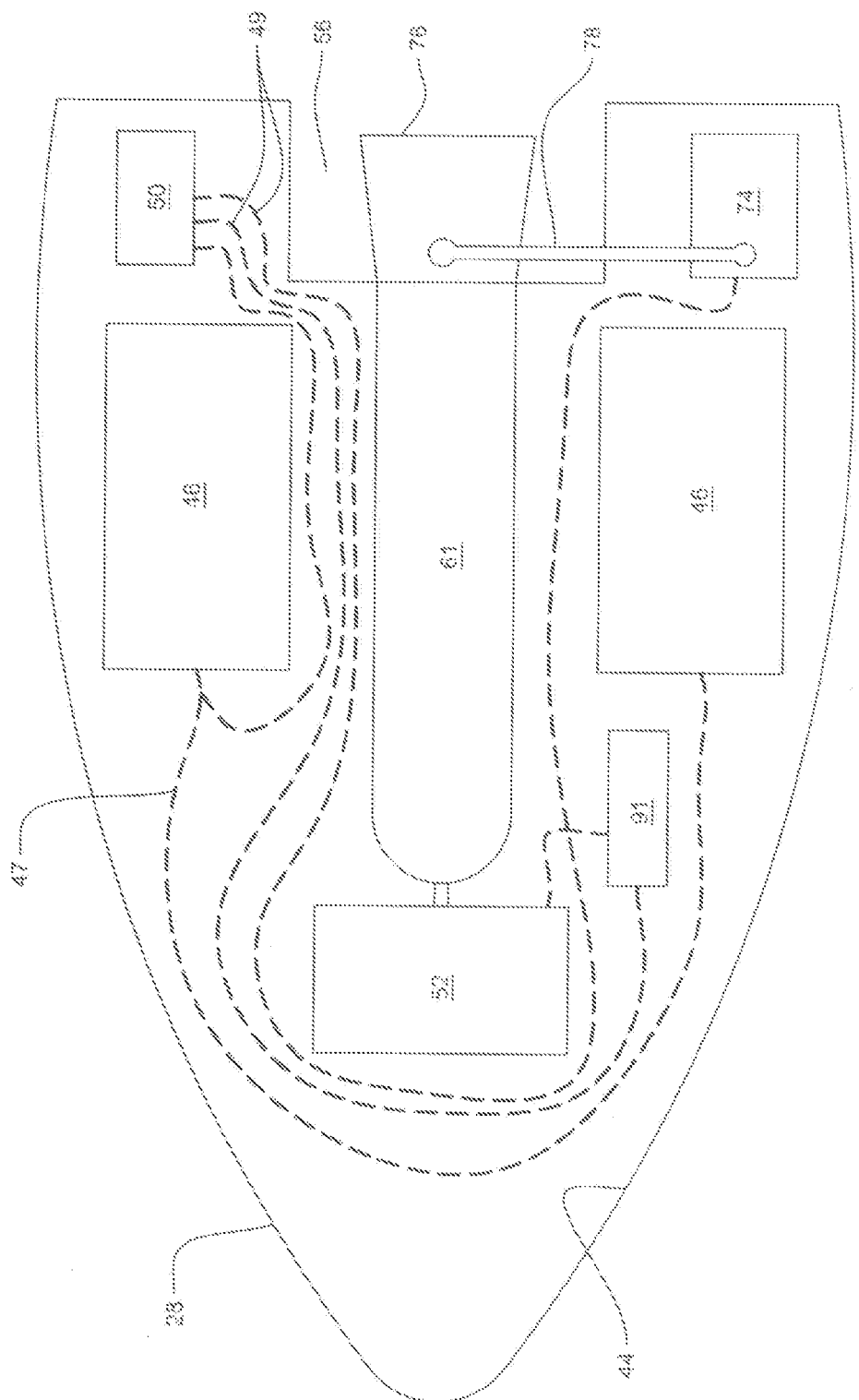
FIG. 4 is a top plan, schematic view of the bobber.
Figure 5:
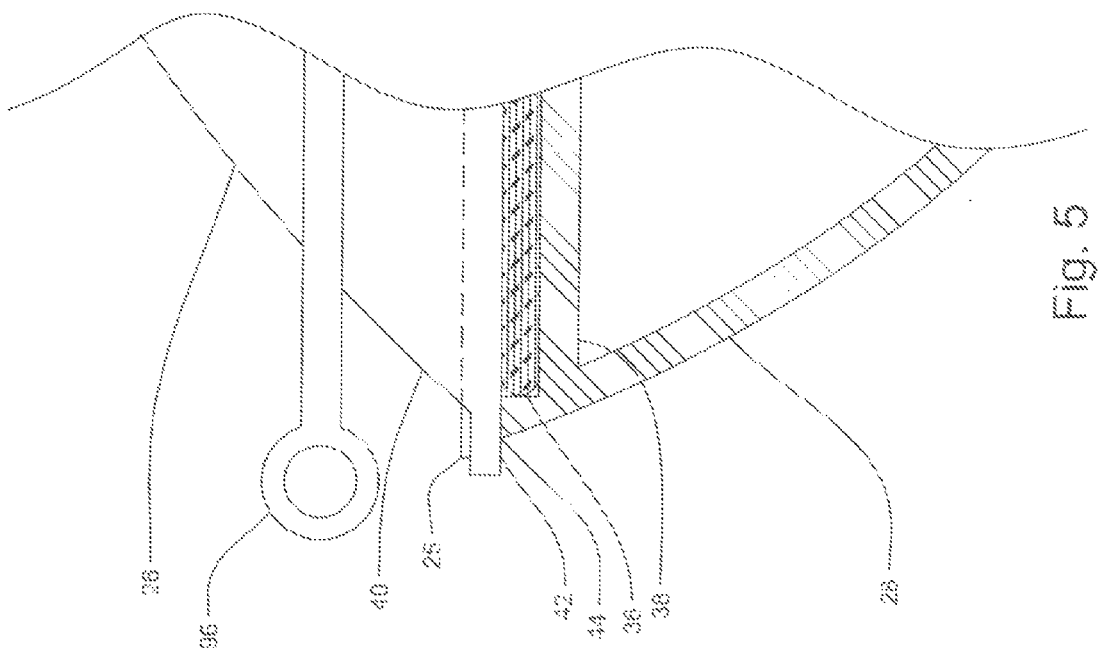
FIG. 5 is a cross sectional view of the leading end of the bobber with the shell portions closed relative to one another.

The bobber itself features a shell 24 composed of a lightweight but relatively durable molded plastic. As shown in FIG. 1 and further depicted in FIGS. 2-4, shell 24 has a streamlined, boat-like configuration. The shell specifically comprises an upper shell component 26 and a lower shell component 28 that are pivotally interconnected in a clamshell-like manner by a hinge or pivot device 30. Various known types of hinges (e.g. piano hinges) and pivots may be employed. The hinge may be built integrally into the upper and lower shell sections or may comprise a separate rust resistant component. When the shell portions 26 and 28 are closed, as shown in FIGS. 1, 2 and 5, shell 24 extends in a streamlined manner from a leading end or bow 25 to a trailing end or stern 27.

Figure 2:
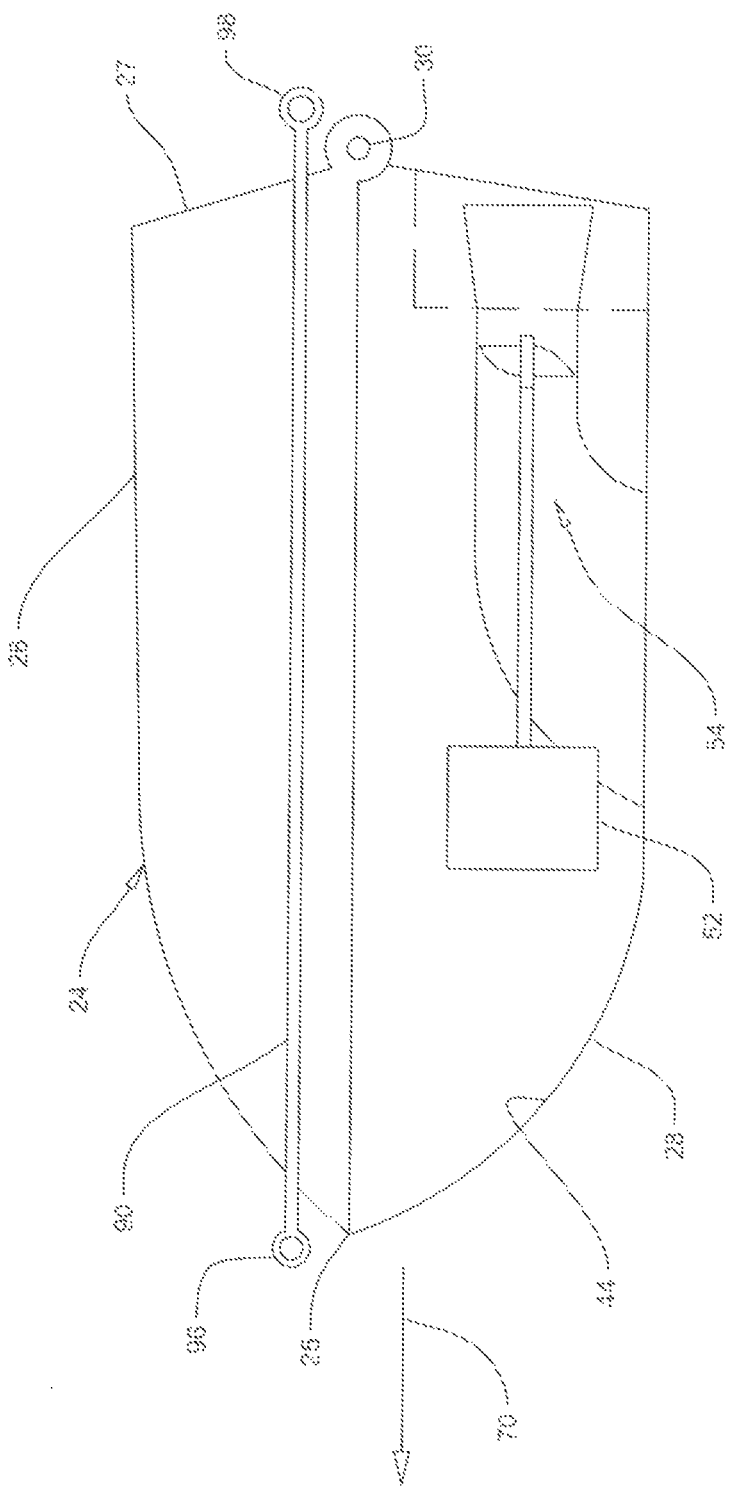
FIG. 2 is a side elevational and largely schematic view of the bobber with the bobber shell in a closed condition; the motor, impeller and steering nozzle are depicted in perspective with the housing of the impeller cut away.

The upper and lower shell portions 26 and 28 include respective recesses or compartment portions that define an interior compartment 32 when shell portions 26 and 28 are closed as shown in FIGS. 1 and 2. Each of the shell portions 26 and 28 includes a generally streamlined profile as represented by shell portion 28 in FIG. 4. The upper and lower shell portions have generally conforming shapes and sizes although one may be minutely smaller than the other to enable the shell portions to fit snugly together in a closed condition. For example, as depicted in FIG. 5, upper shell portion 26 is peripherally slightly smaller than lower shell portion 28. As a result, when the shell portions are closed, as shown in FIG. 5, shell portion 26 fits snugly within lower shell portion 28. A sealing gasket 36 is supported upon a peripheral molded lip 38 formed within lower shell portion 28 just below the upper edge of the shell portion. See also FIGS. 2-4. When upper shell portion 26 is closed against lower shell portion 28, the peripheral edge of shell portion 26 engages gasket 36. The narrow leading end or bow 40 of upper shell portion 26 carries a detent or latch 42. When the shell portions are closed as shown in FIG. 5, detent 42 is interengaged with a slot 44 formed in the leading end of lower shell portion 28. This latches and interlocks the upper and lower shell portions in a closed condition. The upper shell portion is preferably composed of a plastic that is resilient enough to allow detent 42 to be pushed rearwardly to disengage slot 44 under the force of manual (thumb) pressure. This allows the fisherman to disengage the detent from the slot and open the upper and lower shell portions 26 and 28 when access to the interior compartment 32 is required.

Lower shell portion 28 includes a lower recess or compartment portion 44 that supports the electronic and other operative components of bobber 10. The lower shell portion supports both a propulsion device for driving the bobber 10 through the water and a directional control device for steering the bobber through the water. As depicted in FIGS. 1-4, batteries 46, which may comprise various known types of batteries, are mounted in the lower shell portion for energizing the operative components of the bobber. Batteries 46 are connected through appropriate wiring 47 to a signal receiver 50, which is, in turn, electrically connected to the remaining electronic components by wiring 49. Such wiring will be understood to persons skilled in the art. Receiver 50, FIGS. 1 and 4, receives radio or other wireless signals transmitted from control unit 18. A motor 52 powered by batteries 46 is supported within compartment 44. An output of the motor is operatively attached to an impeller 54 of a jet drive propulsion unit 55. This unit is analogous to the propulsion units utilized in personal watercraft but obviously of a much smaller scale and power. The propulsion unit extends rearwardly through the stern wall 62 of lower section 28 and into a central trough 56 extending through lower shell portion 28. See FIG. 2. The propulsion unit 55 includes impeller 54 enclosed in a ducted cylindrical housing 61 and attached by a shaft 59 to motor 52. A steering nozzle 76 is operatively connected to propulsion unit 55 and extends through trough 56. It should be understood that the propulsion unit and steering nozzle are constructed and operate analogously to jet drive units used in personal watercraft. The specific details of such construction will be known to persons skilled in the art. Various other types of propulsion units, featuring propellers for example, may alternatively be used. In the embodiment disclosed herein, impeller 54 is operated, in a manner described more fully below, to drive water rearwardly through the trough. This propels bobber 10 forwardly, as indicated by arrow 70 in FIGS. 1, 2 and 4.

A directional control device includes a servomechanism 74 (FIGS. 1 and 4) and a steering nozzle 76 (FIGS. 1-4) that is communicably engaged with jet drive propulsion unit 55 and operatively connected to servomechanism 74 by a linkage 78. As best shown in FIG. 4, servomechanism 74 is supported within compartment portion 44 of lower shell portion 28. The linkage extends through the rear wall of compartment portion 44 and into central trough 56. It should be understood that appropriate gaskets or seals accommodate typically both the propulsion unit 55 and linkage 78 as those components pass through the walls of shell section 28. This prevents water from intruding into the interior compartment of the bobber. Conventional ducts or ports introduce water into propulsion unit 55 so that the water can be discharged by the impeller in a conventional manner through the nozzle.

Means are providing for receiving wireless operational signals from control unit 18 and directing the operational components of bobber 10 (motor, impeller, steering nozzle) to operate the bobber. In particular, a wireless signal receiver 50 including an appropriate antenna is supported within compartment portion 44 of lower shell portion 28. See FIGS. 1 and 4. Receiver 50 senses propulsion and/or speed signals generated by control unit 18 (through operation of lever 20) and transmits corresponding signals to a motor control device 91, FIGS. 1 and 4. Motor control device 91 comprises an appropriate known type of electronic circuit that selectively actuates motor 52 and dictates the speed of that motor in accordance with corresponding signals sent from the transmitter.

Receiver 50 also detects directional signals that are transmitted from unit 18 by operation of directional control lever 22. Such directional control signals are sent to servomechanism 74, which in turn reacts by operating steering nozzle 76 in accordance with the transmitted directional control signals. The steering nozzle is turned left or right by the linkage, as required, in order to steer the bobber. In alternative versions, a rudder and associated linkage may be substituted for the steering nozzle. Operation of both the propulsion device and the directional control device is described more fully below.

A particularly critical aspect of this invention is the manner in which bobber 10 is engaged with fishing line 14. Such interengagement is accomplished through the use of an elongate rod or pin 90, FIGS. 1-3, 5 and 6, that is mounted to upper shell portion 26 of shell 24. The rod extends longitudinally axially through the upper shell portion from leading end 25 to trailing end 27. Rod 90 may be composed of metal, metal alloys, hard plastic, carbon fiber, cable or other relatively rigid material. Preferably, the rod is not formed unitarily with bobber 10 or upper shell portion 26. As best illustrated in FIG. 6, a forward end of rod 90 extends exteriorly of leading end 40 of shell portion 26 through orifice 100 and includes an eyelet attachment component 96. By the same token, the opposite, rearward end of rod 90 extends through an orifice 102 in the rearward or stern wall, the trailing wall, of shell portion 26 and extends rearwardly of stern 27. The rearward end of rod 90 terminates in an eyelet attachment component 98. It is important that the eyelets 96 and 98 are larger than the orifices in upper shell portion 26 through which rod 90 passes. This restricts the eyelets from sliding through the orifices and prevents rod 90 from sliding out of and being removed from the upper shell portion 26. Essentially, rod 90 is held in place such that it extends axially longitudinally through shell 24 and entirely within the upper shell portion.

Although discrete segments 14a and 14b of fishing line 14 may be tied directly to eyelets 96 and 98 respectively, it is preferred that the connecting rod 90 be attached to the discrete fishing line segments through respective swivel devices. In particular, fishing line segment 14a is connected to forward eyelet 96 through a swivel component 110. This is a standard fishing swivel component including a clip 112 that is selectively opened and engaged with eyelet 96. By the same token, line segment 14b is joined by a second swivel component 106 to eyelet 98. A standard clip 108 carried by the swivel component 106 is selectively engaged with the eyelet to complete the connection. It should be understood that the swivel attachments and clips are conventional and used in many applications in fishing rigs. The swivels 110 and 106 allow bobber 10 to freely rotate axially between the discrete fishing line segments 14a and 14b. This permits the bobber to maneuver freely through the water without becoming entangled with the fishing line. Indeed, the foregoing construction significantly reduces the risk of the line entangling with the bobber, as well as vegetation and debris.

Connecting rod 90 greatly increases the structural integrity of the bobber and minimizes stress exerted upon the bobber by tension along the fishing line. Instead of clamping or otherwise attaching the plastic shell 24 directly to the line and having line tension exerted directly upon the plastic shell, the line is tied to respective ends of an interior but entirely separate rod 90. The tension forces are exerted along the rod rather than along the plastic shell. The risk of damaging the bobber is thereby reduced significantly.

An additional advantage of this invention is that the operational and/or electronic components (i.e. the batteries, motor, propulsion unit, control circuits and steering nozzle) are supported entirely below the connecting rod by the lower shell portion. This provides the floatable bobber 10 with an extremely low center of mass. As a result, the bobber is "self-righting". When the bobber is initially cast or after the hook is struck by a fish, the bobber and axially aligned connecting rod may tilt from the horizontal orientation depicted, for example in FIG. 1. Nonetheless, due to the low center of mass, the bobber will almost immediately return to the depicted orientation wherein the connecting rod is oriented substantially horizontally. In this condition, the streamlined bobber is free to rotate axially so that entanglements are avoided as previously described. At the same time, the connection between the discrete fishing line segments and the eyelets at the end of rod 90 prevents premature fraying and failure of the fishing line.

In operation, the fisherman attaches (ties) bobber 10 to segments 14a and 14b of fishing line 14 in the manner shown in FIG. 1. The fisherman then casts the bobber along with the hook and other elements of the fishing rig toward an intended fishing target. If the fisherman initially misses the target or the bobber subsequently drifts out of the target area, bobber 10 and suspended hook 17 are quickly and efficiently returned to the target area by simply operating the remote control unit 18. The fisherman operates lever 20 of control unit 18, which may alternatively comprise a dial, a joystick, one or more control buttons or other known types of adjustable signal actuator. This transmits a wireless signal directing operation of motor 52 and impeller 57. Unit 18, which may include various known types of electronic signal transmitters and controllers, may also incorporate a speed control that is operated (again in a known fashion by lever 20 or otherwise) to increase or decrease the speed of motor 52 and thereby the speed of impeller 57. In either event, an appropriate signal is received by receiver 50 and directed to motor control 91. The motor control then operates motor 52, typically at a desired speed, to drive the bobber 10 forwardly in the direction of arrow 70.

By the same token, directional control lever 22 (or other known type of adjustable signal control mechanism) of control unit 18 is operated in a known manner to steer bobber 24. This causes unit 18 to transmit, a directional control signal, which is sensed by receiver 50. A signal is, in turn, sent by the receiver to the servomechanism 74 that operates steering nozzle 76 to steer the bobber. It should be understood, that is certain embodiments, receiver 50 may be separated into multiple receivers for respectively receiving propulsion/speed and directional signals. In certain embodiments, the receiver (s) may be incorporated or integrated into the motor control and servomechanism respectively. In some versions, the speed and directional controls of transmitting control unit 18 may be integrated into a single lever or other type of adjustable control. Various known means of electronic remote control circuits and assorted types of transmitters and receivers may be employed to control operation of bobber 10 within the scope of this invention. Such details will be understood to persons skilled in the art.

The construction of bobber 10 allows the bobber to be quickly and conveniently repositioned and/or held in a target area by the fisherman. Repeated, time consuming and tedious recasting is eliminated. The streamlined shape and improved swivel interconnection between fishing line segments and the elongate connecting rod further improve maneuverability of the bobber. The bobber is far less likely than known bobbers to become entangled with weeds, debris or the fishing line itself. The self-righting nature of the bobber configuration also contributes to a tangle-free and hassle free operation.

It should be understood that various aspects of this invention may be modified in a manner that will be known to persons skilled in the art. The transmitter unit may include various known types of actuators (levers, dials, joysticks, etc.) and circuitry. The transmitter may be positioned at various points on the rod and in some cases may be supported and/or located independently of the fishing rod. Various alternative bobber configurations may be utilized although a streamlined, boat-like shape is especially preferred.

In certain versions, the positioning of bobber 10 may be reversed. The segment of fishing line from rod 12 may be attached to the trailing end 27 of bobber 10 and the hook and leader may be connected to rod 90 at the leading end 25 of the bobber.

Figure 7:
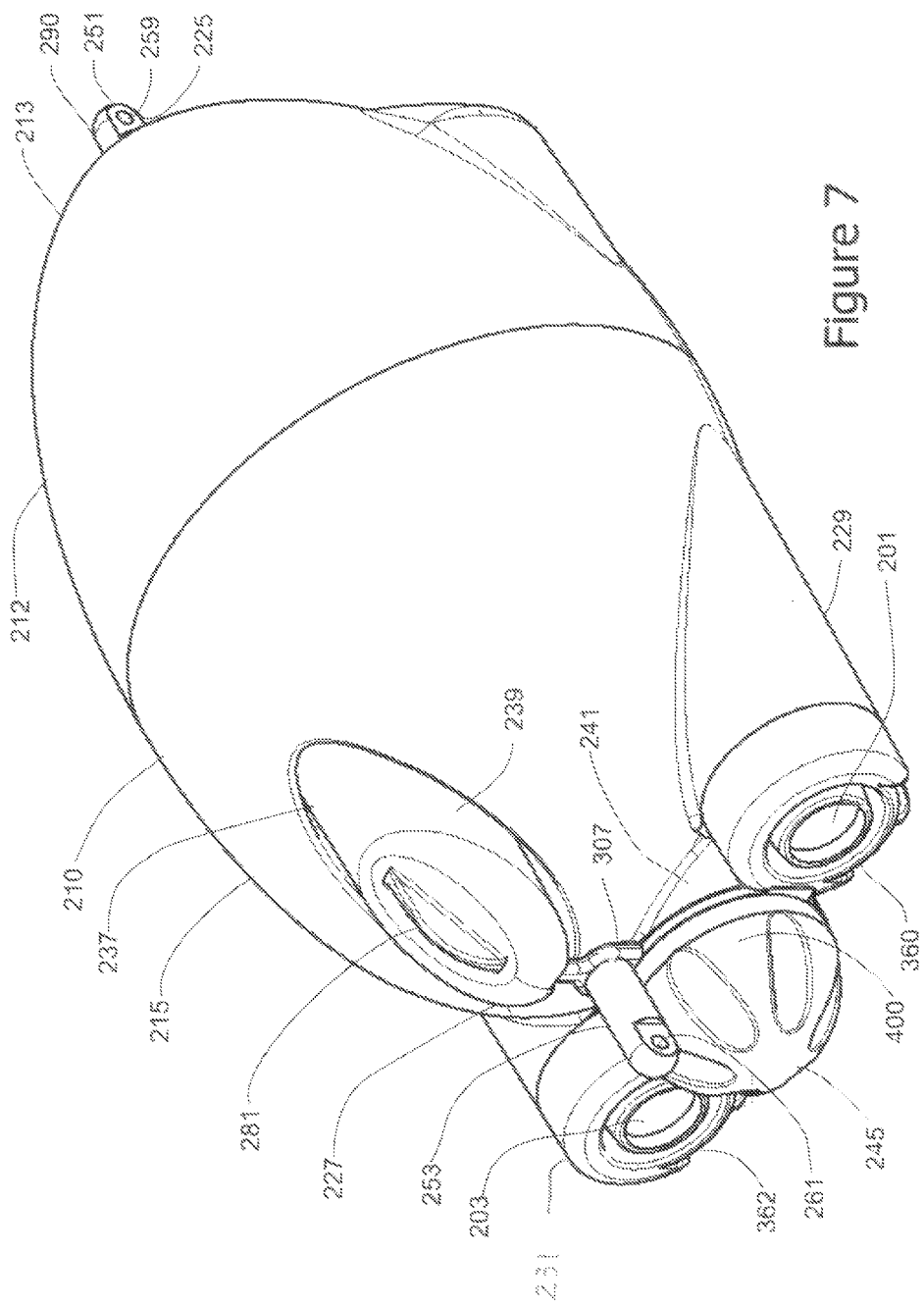
FIG. 7 is an upper perspective view of an alternative preferred remote controlled bobber in accordance with this invention.
Figure 8:
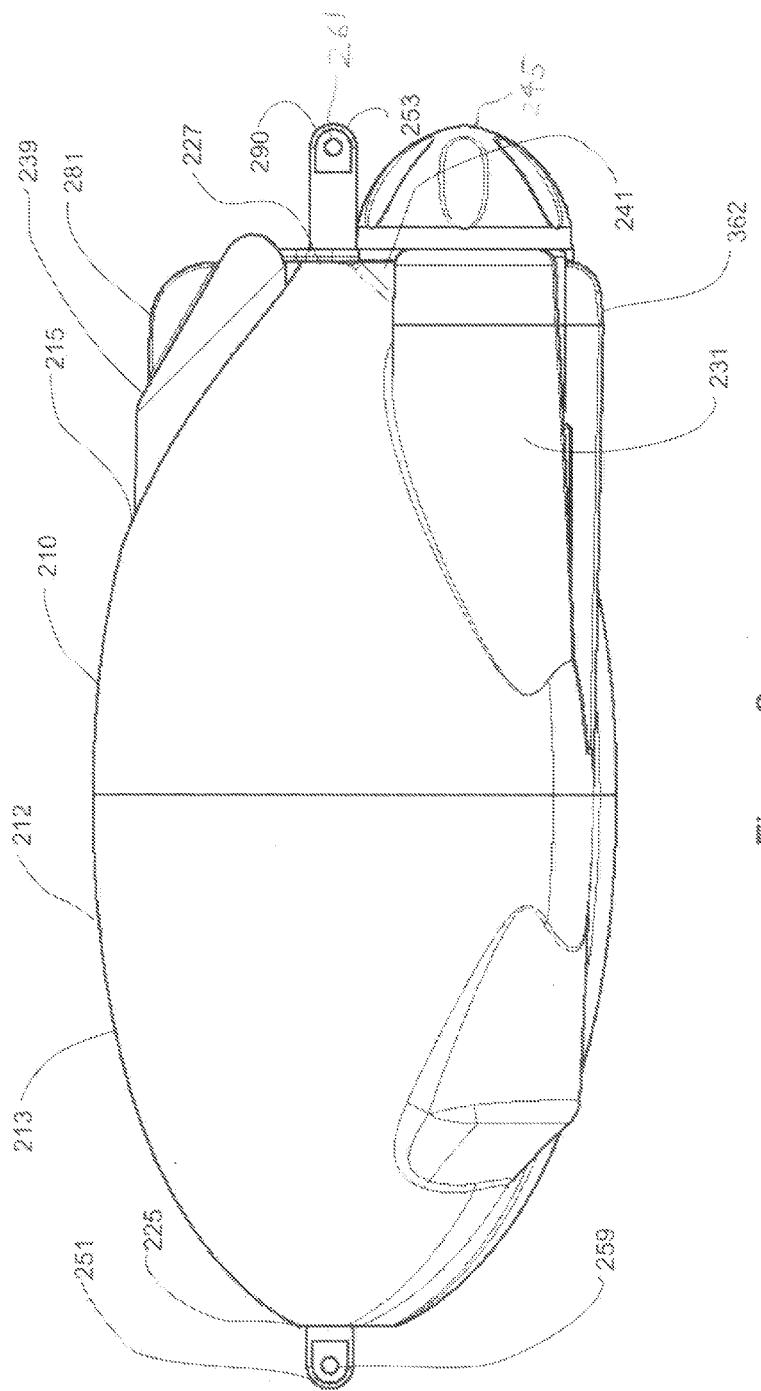
FIG. 8 is a side elevational view of the bobber of FIG. 7.

FIGS. 7 and 8 depict an alternative remote controlled bobber 210 that may be interconnected between a fishing line and a leader in the manner previously described. Bobber 210 features an elongate, molded plastic shell 212 comprising leading and trailing portions 213 and 215, respectively, which are permanently joined together by sonic welding or other secure means of fastening that will be known to persons skilled in the art. A durable, yet lightweight and floatable plastic is preferably employed. Bobber 210 features a hydrodynamically streamlined shape proximate both a leading end or bow 225 and a trailing end or stern 227. More specifically, leading and trailing sections 213 and 215 of shell 212 taper inwardly in opposing, hydrodynamically streamlined directions toward the respective leading and trailing ends 225 and 227, respectively. This provides the bobber shell with the ability to move easily through the water in either longitudinal direction so that the bobber is propelled readily through the water and can be retrieved quickly and conveniently when a fish is hooked.

Figure 9:
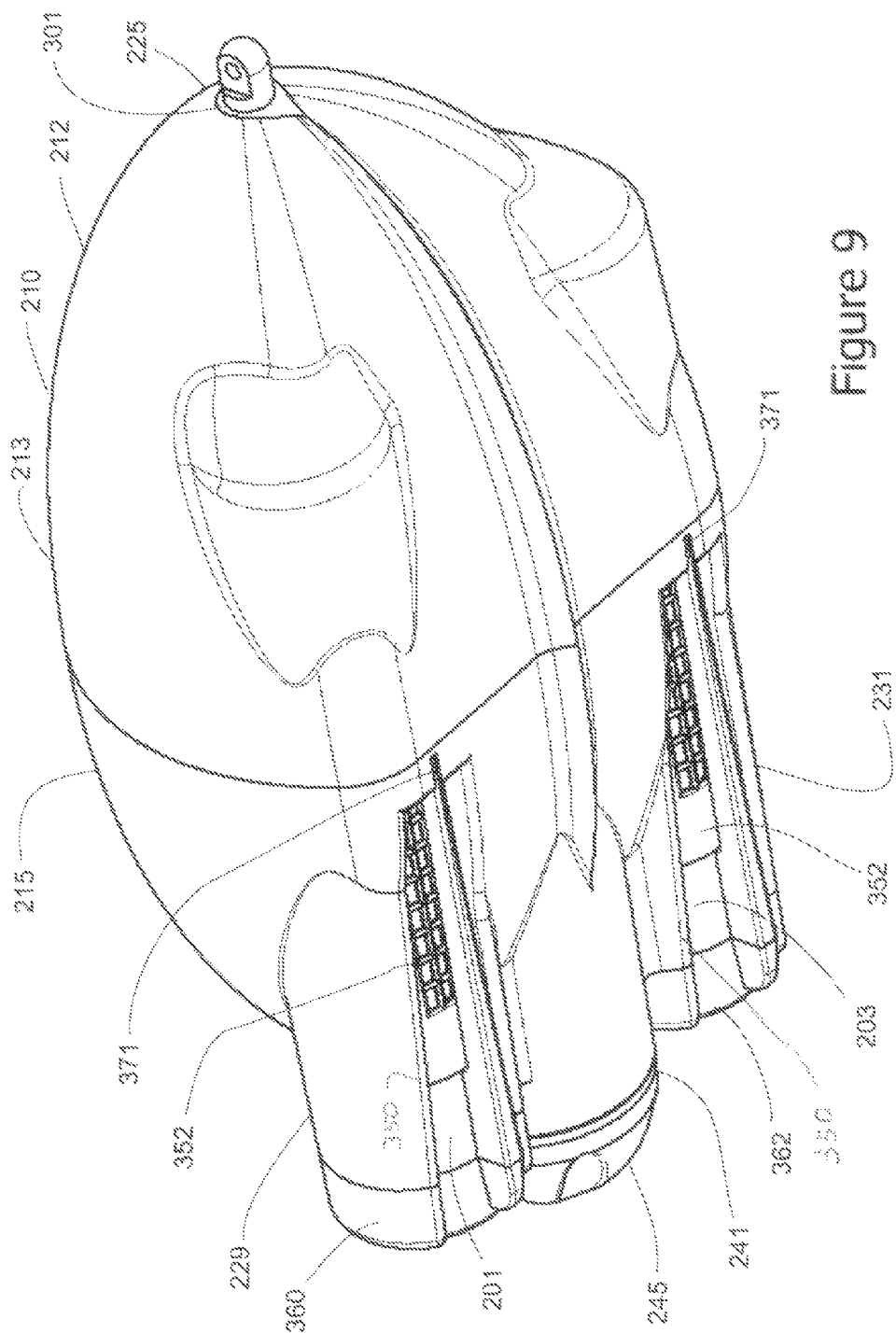
FIG. 9 is a bottom perspective view of the bobber of FIG. 7 with the connecting rod removed from the central longitudinal channel of the shell.

As shown in FIGS. 7-9, shell 212 further features a pair of jet drive receptacles 229 and 231, which are attached integrally to and extend rearwardly from trailing section 215 of shell 212. These receptacles accommodate respective jet drive assemblies 201, 203 that are assembled and operated to propel bobber 212 in a manner described more fully below.

Figure 10:
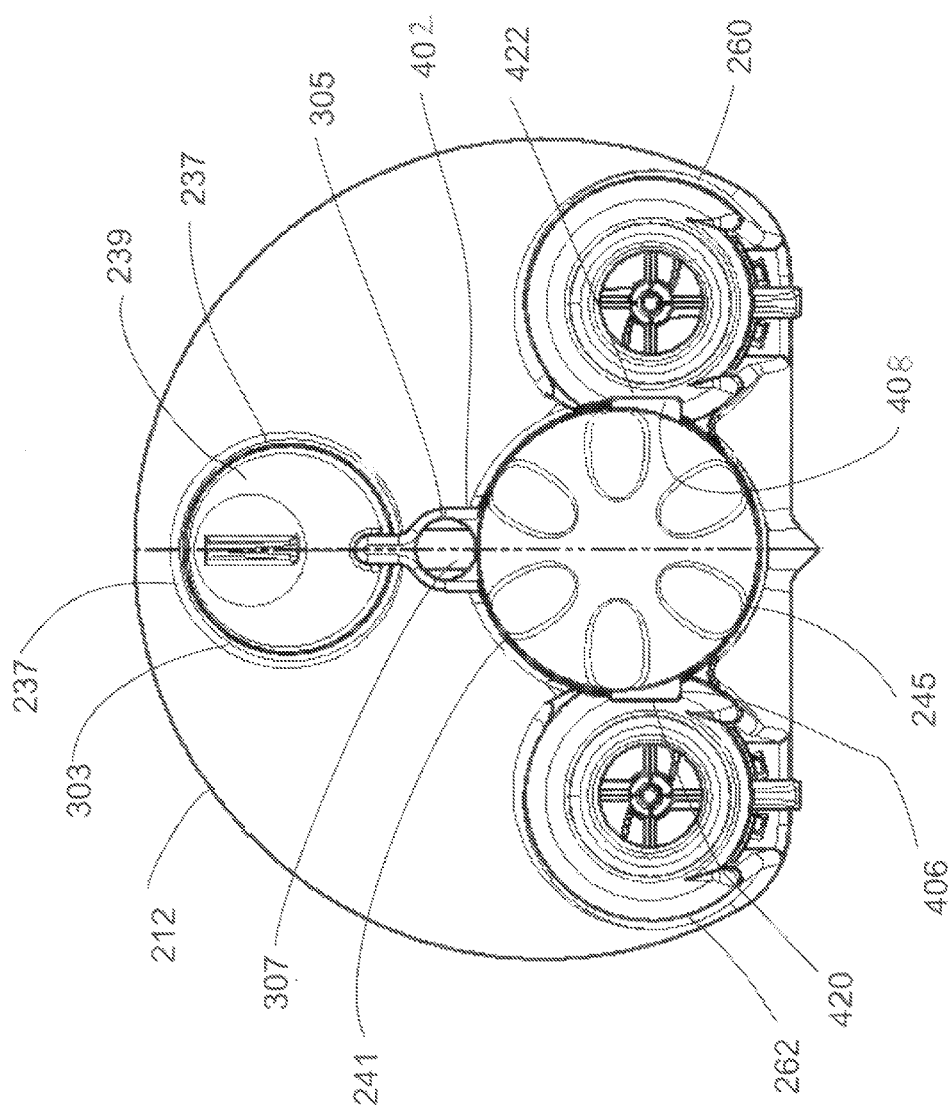
FIG. 10 is an elevational view of the trailing end of the bobber of FIG. 7.

An opening 237, FIGS. 7 and 10, formed in trailing section 215 of shell 212 communicates with a control unit receptacle formed within the bobber shell and described more fully below. Hole 237 is selectively opened and closed by a transparent control unit closure 239, which is shown in FIGS. 7, 8 and 10. This closure carries a tab 230 that allows for convenient gripping and therefore opening/closing of the closure. Interengagement between the cap 239 and the interior of shell 212 is again described more fully below.

As further shown in FIGS. 7-10, a battery accommodating chamber 241 is attached unitarily to trailing section 215 of bobber shell 212 and extends rearwardly therefrom between parallel jet drive receptacles 229 and 231. Chamber 241 receives a battery for powering the control and propulsion components of the bobber in a manner described below. A threaded battery chamber plug or closure 245 is selectively secured to a threaded opening in trailing portion 212 for closing the otherwise open end of chamber 241.

FIGS. 7 and 8 particularly disclose the respective ends of an elongate connecting rod assembly 290, which extends longitudinally through bobber shell 212 and beyond the respective ends 225, 227 thereof. The rod assembly is omitted for clarity in FIGS. 9-11. As illustrated in FIGS. 7 and 8, rod tips 251 and 253 are carried at respective ends of rod assembly 290 and extend respectively beyond leading and trailing ends 225 and 227 of bobber shell 212. Eyelet holes 259 and 261 are formed respectively in tips 251 and 253 for attaching respective sections of fishing line to the ends of rod assembly 290. The structure for mounting the rod assembly within the bobber shell is described more fully below in connection with FIG. 19.

Figure 11:
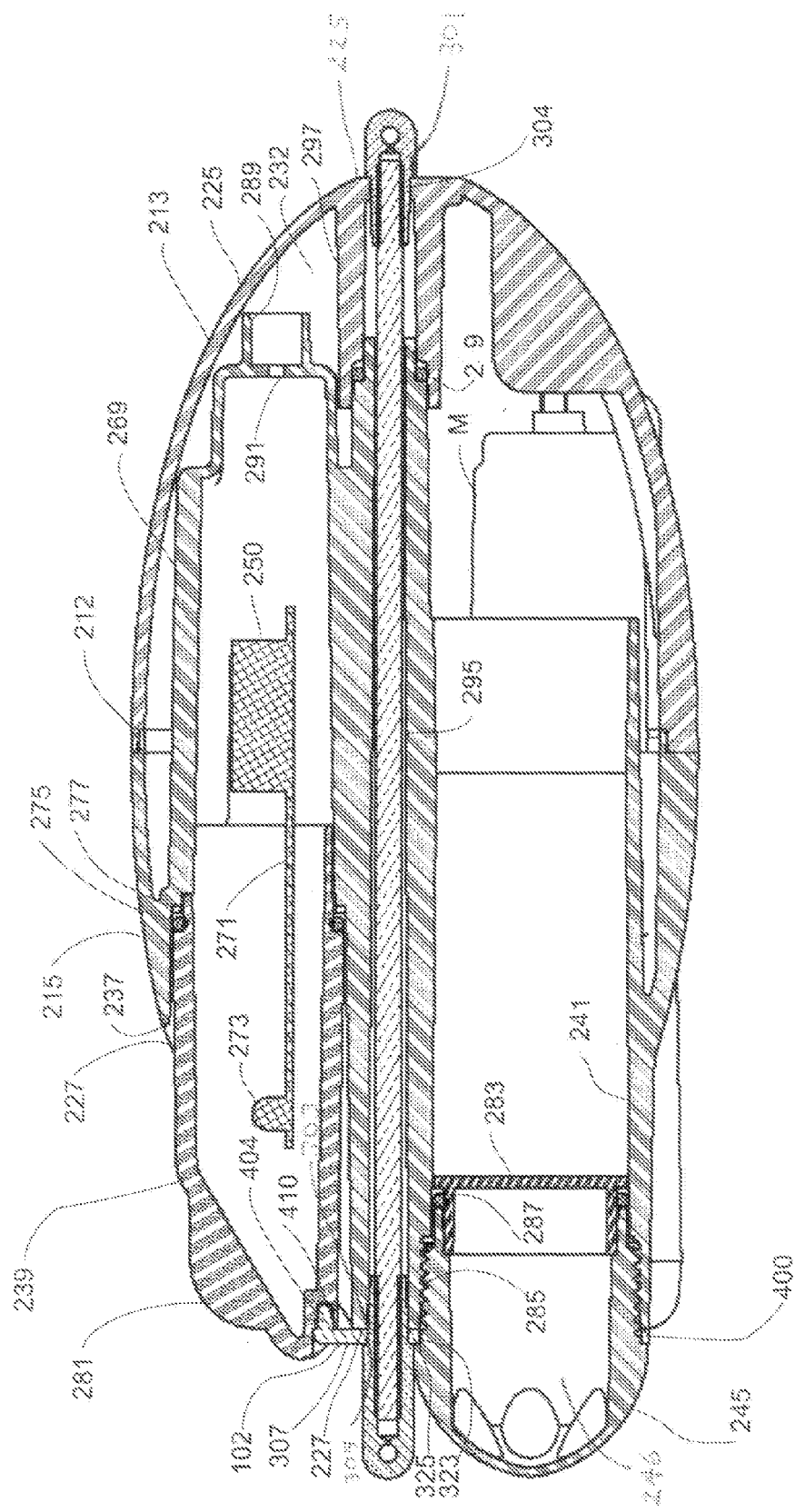
FIG. 11 is a side, cross sectional view of the bobber of FIG. 7 with the connecting rod omitted and particularly depicting the control unit and battery storage receptacles.

FIG. 11 depicts bobber shell 212 cross sectionally and, more particularly, shows the interior of the bobber shell along a sectional plane that extends longitudinally through the center axis of the bobber shell. Shell 212 features an interior compartment 232 in which is formed a control unit receptacle 269 located in an upper half portion of the shell. An electronic control unit 250 comprising a wireless signal receiver and a microprocessor, as previously described, is received by receptacle 269. Typically, the receiver, microprocessor and other electronic components are mounted on a printed circuit board that is fit snugly within receptacle 269, yet is movable with finger force to permit convenient installation and removal of the board by the user. Circuit board 271 extends outwardly from receptacle 269 and carries an LED 273 that is operably connected to control unit 250. Hole 237 in shell 212 communicates with the interior of receptacle 269. Transparent closure 239 is removably received by hole 237 for selectively closing and opening receptacle 269. When closure 239 is closed, a neoprene O-ring 275 and O-ring retainer 277 interengage closure 239 and the outer end of receptacle 269 to prevent water from entering the electronics accommodating receptacle when the bobber is in use. Closure 239 may be selectively removed by grasping outer tab 281 and pulling closure 239 outwardly to disengage the closure from the bobber shell. This allows the control unit 250 and attached LED 273 to be easily removed and replaced as needed.

Battery chamber 241 is formed longitudinally centrally through the bobber shell in a lower portion of the shell. A battery (not shown) for providing power to control unit 250, LED 273 and motors M of the respective propulsion units (described below) is received in chamber 241 and held in place by battery cap 283. The battery cap is secured snugly in place against the battery in the chamber by the battery plug 245, which is threadably interengaged with corresponding threads 285 formed about the entrance to the battery chamber. An O-ring seal 287 interengages battery plug 245 and cap 283 when plug 245 is attached to prevent water from entering the battery chamber when the bobber is in use. Cape 283 is snugly received by and sealed within the inner end of plug 245 to provide an air-tight cavity 246 within plug 245. This enables the plug to float if it is removed from the bobber and accidentally dropped in the water.

Appropriate electrical wiring (not shown) is interconnected from the battery to the electronic control unit 250 and LED 273 within receptacle 269. In particular, the wiring extends between the battery and control unit 250 through shell compartment 232, as well as mouth 289 and orifice 291 of receptacle 269. The wiring attaches to the electronic components of control unit 250 in a standard manner. Likewise, appropriate wiring is operably interconnected between the battery and the propulsion motors M that operate the jet drive units, which will be described more fully below. The particular means and components for electrically interconnecting the wiring between the battery and the electrical/electronic operating components of the bobber will be understood to persons skilled in the art.

A central channel 295 is formed longitudinally within compartment 232 generally between the upper control unit receptacle 269 and battery chamber 241, which is constructed in a lower half portion of the shell. Channel 295 accommodates and supports connecting rod assembly 290. A forward end of channel 295 is received by a support bushing 297 attached unitarily to and extending inwardly from leading end 225 of bobber shell 212. The leading end of channel 295 and bushing 297 are interengaged by an O-ring 299, which further prevents leakage of water into the interior of the bobber shell during use. A forward end of receptacle 295 is generally aligned with a rod-accommodating opening 301 formed in leading end 225 of bobber shell 212. Similarly, a trailing end 303 of the rod-accommodating channel defines a rod-accommodating hole at the rearward end 227 of the bobber shell. Rearward opening 303 is generally aligned with the central hole 305 of a plastic locking component 307. When the bobber is fully assembled and plug 245 is engaged with shell 212, locking assembly 307 serves to hold various components of the bobber, including control unit closure 239 and the jet drive assemblies 201, 203 in a closed, locked condition. The construction of the locking component and its advantageous locking operation are described more fully below.

It should be understood that the various separate spaces formed in the shell compartment 232, including receptacle 269, chamber 241, channel 295 and jet drive receptacles 229 and 231 are all defined by plastic material that is molded or otherwise formed unitarily with bobber shell 212. The particular configuration, size and construction of each of these respective spaces may be modified within the scope of this invention.

Figure 13:
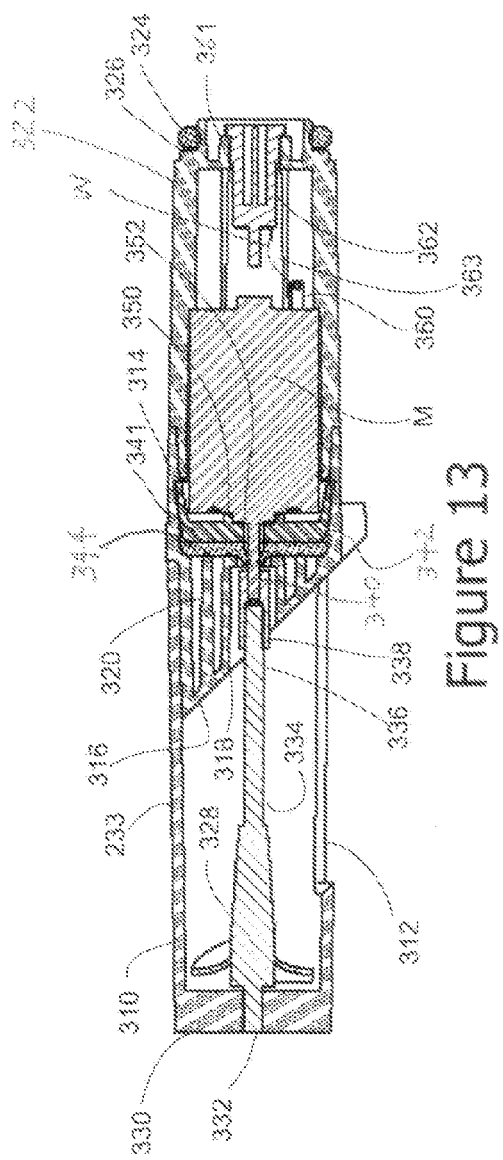
FIG. 13 is a cross sectional view of the jet drive unit.
Figure 12:
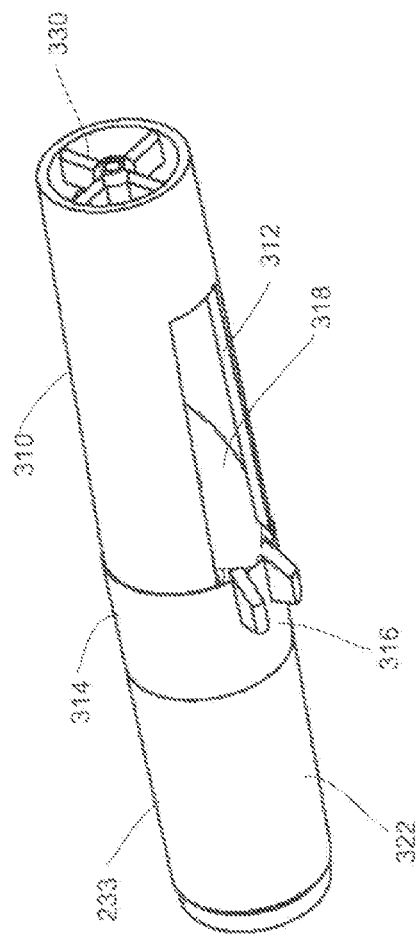
FIG. 12 is a bottom perspective view of a replaceable jet drive unit used in the embodiment of FIG. 7.
Figure 14:
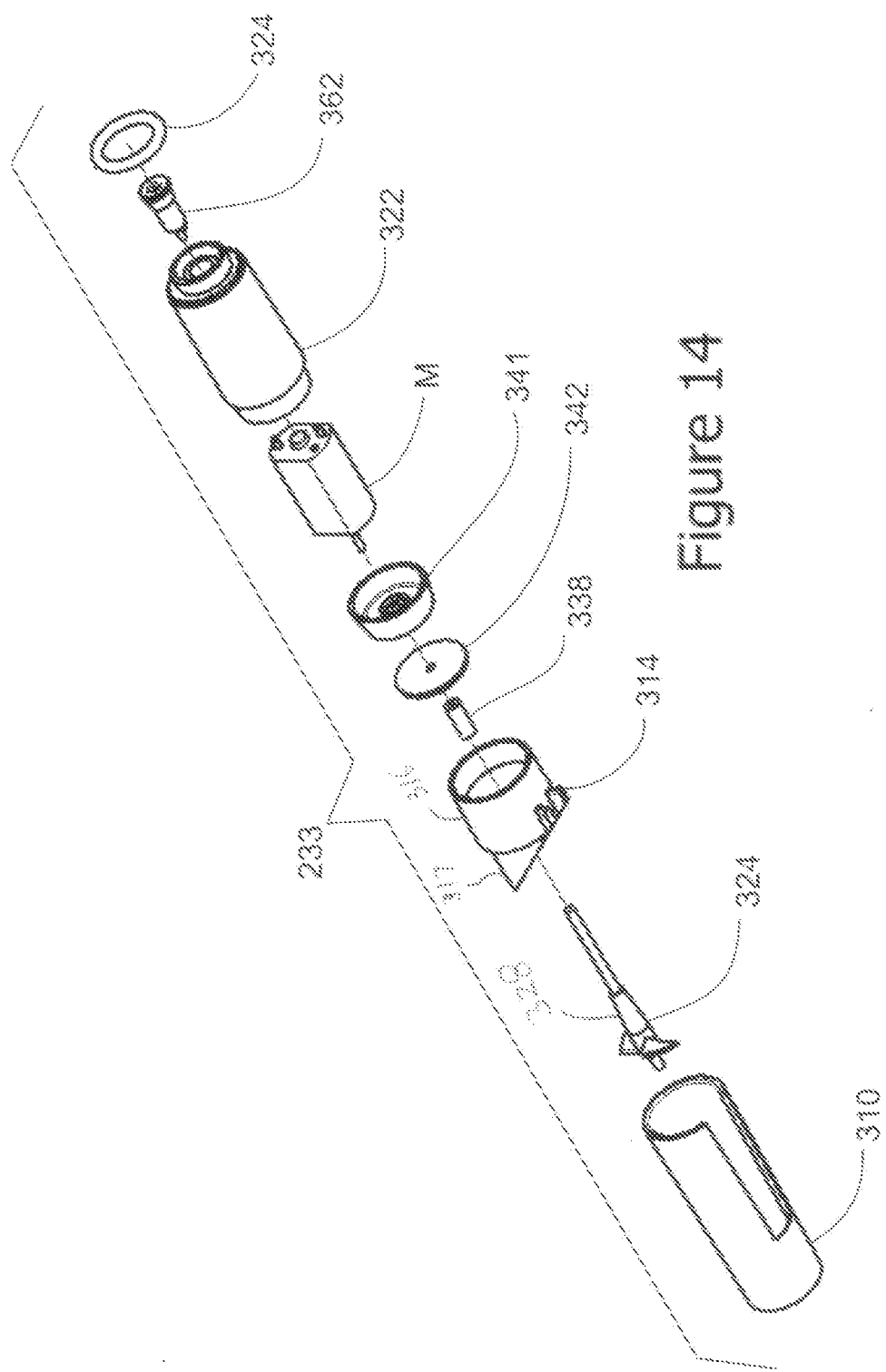
FIG. 14 is an exploded view of the jet drive unit.

A representative jet drive unit 233 used in each of jet drive assemblies 201, 203 is shown in FIGS. 12-14. It should be understood that the second jet drive assembly features a jet drive unit having a virtually identical respective construction. In particular, a generally cylindrical housing 310 having an elongate lower slot 312 formed therein is attached to a jet drive body 314 having a cylindrical section 316 and a diagonally cut leading section 317. As best shown in FIG. 13, section 317 includes a central opening 318 and a series of concentric rings 320. Section 314, in turn, interengages and attaches to a drive end cap 322. The end cap carries an O-ring seal 324 about a reduced diameter portion 326 of the end cap.

A propeller 328 is axially rotatably mounted to extend between jet drive body 314 and a support bearing 330 located at a trailing end of housing 310. More particularly, end 332 of propeller shaft 334 is axially rotatably mounted in bearing 330. The opposite end 336 of shaft 334 is connected by a shaft coupling 338 to the spindle 340 of propulsion motor M. The motor is itself mounted within an interior chamber of jet drive end cap 322. More particularly, motor M is held in the end cap compartment by a sealed retainer cup 341 which is received by cylindrical section 316 of body 314 and which includes an annular ring 350 for conformably and retainably interengaging motor M. Cup 341 also includes a central bearing 352 for axially rotatably receiving the spindle 340 of motor M. A flat cylindrical seal 342 interengages the opposite surface of cup 341 and a lip 344 of jet drive body 314. This seal compresses against the motor shaft 252 and prevents water circulated within the jet drive housing 310 from entering end cap 322 and damaging motor M. Concentric rings 320 spread the force of seal 342 so that such force is not concentrated completely on the motor shaft. Motor M includes an electrical connecting terminal 360 that allows the motor to be interconnected to electrical wiring from the battery, as previously described. A female connector 362 is plugged into a receptacle 361 in cap 322. This connector carries a terminal 363, which is joined to terminal 360 of motor M by wire W. This allows electrical wiring to be effectively interconnected between the battery and terminal 360 in a manner described and shown more fully below.

Figure 16:
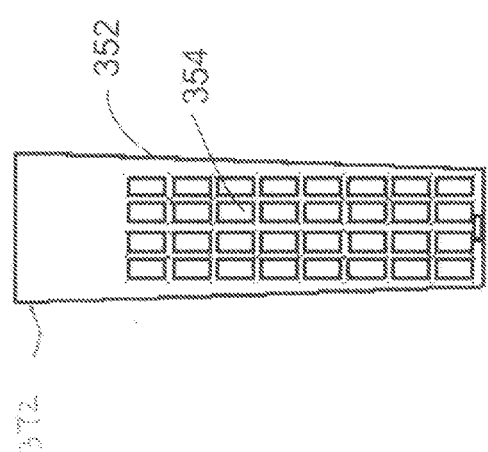
FIG. 16 is a plan view of the water transmitting screen used for the jet drive unit.

FIG. 15 illustrates the manner in which the jet drive units are installed in bobber shell 212. Representative jet drive unit 233 is removably and replaceably received in a corresponding jet drive receptacle 229 of shell 212. As previously indicated, the other jet drive unit of assembly 203 is similarly received by receptacle 231 on the port side of the bobber. As further shown in FIG. 9, an elongate slot 350 is formed in the bottom of each jet drive receptacle 229 and 231. This allows water to be drawn into the jet drive assemblies for propelling the bobber. More particularly, referring to FIGS. 9, 15 and 18, each slot 350 communicates with the interior of a respective jet drive unit 233 and 235 through a respective inlet screen 352, shown alone in FIG. 16. Inlet screen 352 includes a plurality of inlet apertures 354 that are sized and configured to both permit the introduction of water into the jet drive in order to properly propel the bobber and to restrict foreign substances such as fishing line, weeds and debris from entering the jet drive unit. The inlet screen 352 is mounted over the jet drive unit such that apertures 354 communicate with inlet slot 312 of housing 310.

Figure 17:
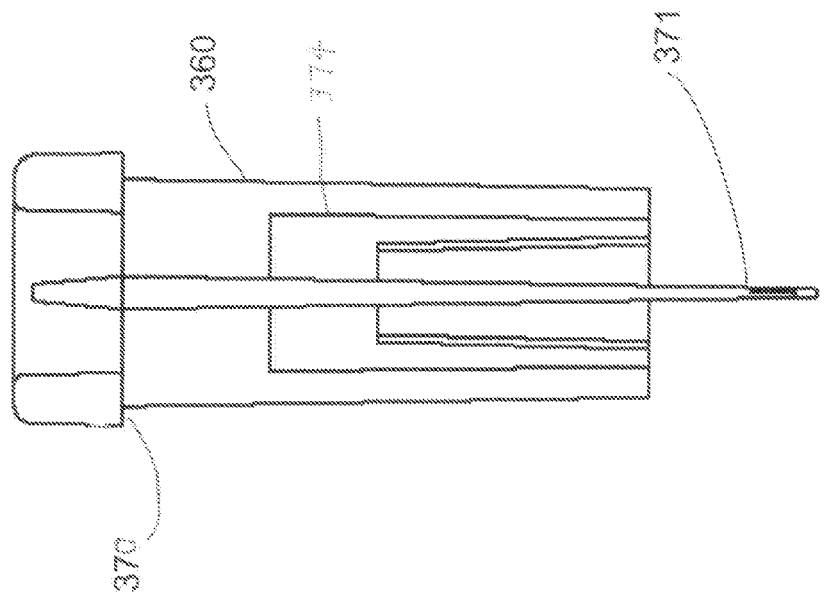
FIG. 17 is a plan view of the jet drive mounting cover.

More particularly, both the jet drive unit 233 and the inlet screen 352 of each jet drive assembly 201, 203 are retained within the bobber shell by a respective jet drive mounting cover 360, 362. See FIGS. 7, 8 and 9. Mounting cover 360 is shown alone in FIG. 17. As further depicted in FIGS. 15 and 18, cover 360 is received within jet drive receptacle 229 such that it snugly interengages the jet drive unit 233 accommodated within receptacle 229, as well as the inlet screen 352 engaged with slot 312 of jet drive unit 233. Cover 360 includes a semi-circular groove 370 that accommodates an insertion tab 370 of inlet screen 352. The inner end on cover 360 includes a longitudinal slot 374 that corresponds to the inlet screen and slot 312 in the jet drive unit. Otherwise, the mounting cover wraps about the jet drive unit and interengages a notch 376, FIG. 15, in bobber shell 212. As further shown in FIG. 15, the anterior end of cover 360 includes a discharge port 380 for discharging water propelled by jet drive unit 233. Elongate mounting clips 371, FIGS. 15, 17 and 18, extend from the bodies 372 of respective covers 360 and 362 and fully over the respective inlet screens 352 such that the distal ends of clips 371 engage the bottom of the bobber shell as best shown in FIG. 18. This holds the screens 352 and underlying jet drive units 233 securely in place within the respective jet drive receptacles.

With the jet drive unit 233 installed in bobber 212 as shown in FIG. 15, a male connector component 381 is interengaged with female connector component 362. The male connector component includes terminals 383 that are connected by standard wiring to the battery. As previously indicated, the female connector component is electrically interconnected to the motor, also by wiring W. O-ring 234 seals the interior of receptacle 229 such that water transmitted through the housing by propeller 322 is restricted from contacting the electrical components of the jet drive unit.

The jet drive units are easily removed and replaced by simply disengaging the jet drive mounting covers 360 and 362 from respective receptacles 229 and 231. While the bobber is in use, locking device 307, best shown in FIGS. 7, 10 and 11, maintains both the jet drive covers 360 and 362 and the transparent control unit cap 239 in a closed and locked condition. Locking component 307 includes ring 400 that surrounds battery plug 245 (See FIGS. 7 and 11). A tab 402. FIGS. 10 and 11, having opening 305 formed therein extends upwardly from ring 400. A locking detent 404 (FIG. 11) is carried by tab 402. By the same token, locking tabs 406 and 408 are similarly carried by respective sides of locking ring 400, as best shown in FIG. 10.

The control unit receptacle and jet drive receptacles are locked in a closed condition as follows. With the control unit installed in control unit receptacle 269 and respective jet drive units 233 installed in the jet drive receptacles, closure 239 is engaged with hole 237. Jet drive mounting covers 360 and 362 are similarly engaged with respective jet drive receptacles 229. As shown in FIG. 11, detent 404 of locking tab 402 is inserted snuggly into slot 410 formed in cap 239. By the same token, tabs 406 and 408. FIG. 10, are respectively engaged with conforming recesses 420 and 422 formed respectively in retaining caps 262 and 260. Plug 245 is tightened so that caps 239, 262 and 260 are effectively locked in place. This holds the electronic control unit, as well as the jet drive units securely in place in the bobber shell during operation of the bobber.

Figure 19:
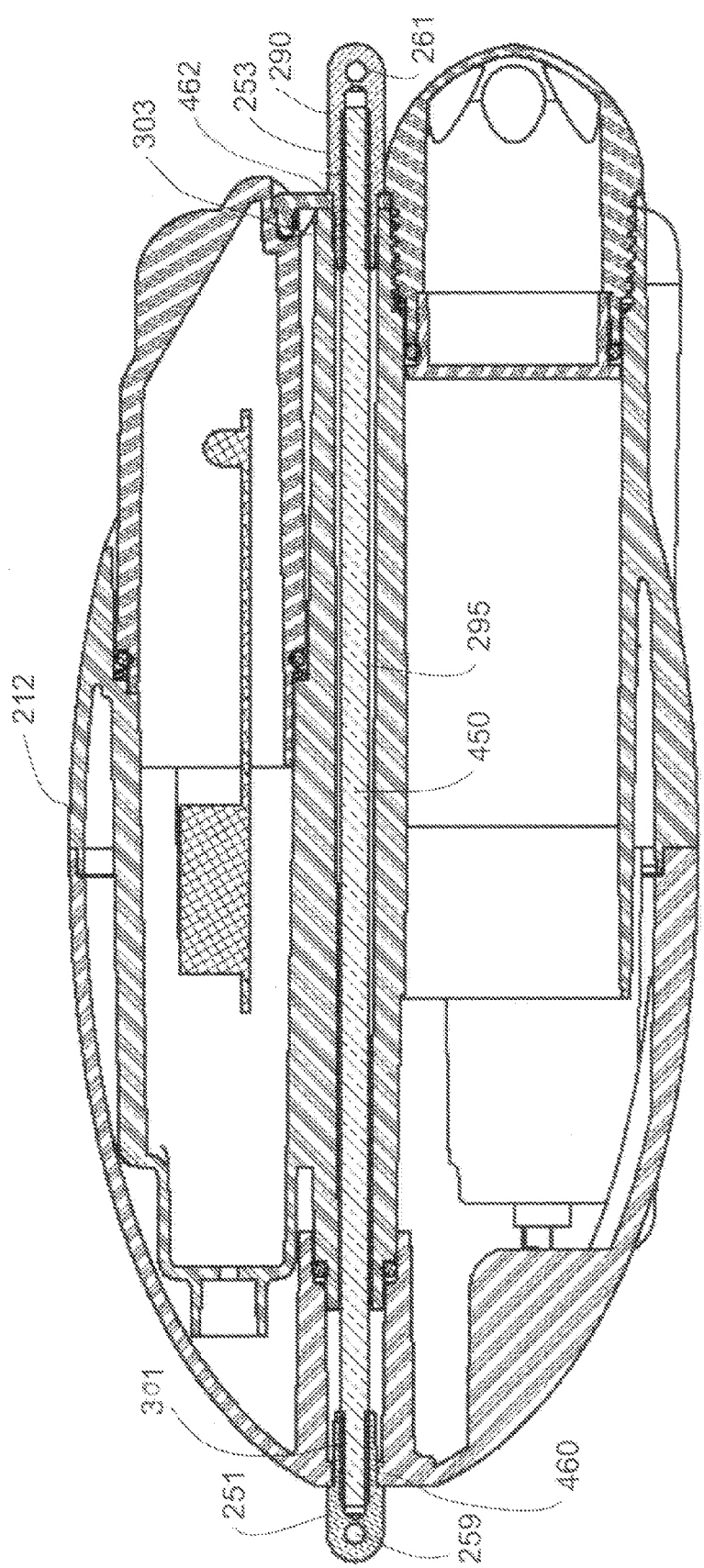
FIG. 19 is a side cross sectional view of the embodiment of FIG. 7 and particularly depicting the connecting rod that extends longitudinally through a channel in the bobber shell.

As shown in FIG. 19, a connecting and strengthening leader rod assembly 290 is accommodated by channel 295 of bobber shell 212. Rod assembly 290 includes an elongate rod 450 having threaded ends. The forward threaded end threadably interengages a threaded bore of leader tip 251. The threaded rearward end of rod 450 receives and interengages the threaded interior bore of tip 253. The respective tips include reduced diameter portions that are received in holes 301 and 303 formed respectively at the forward and rearward ends of the bobber. Shoulders 460 and 462 on the respective tips interengage the forward and rearward ends of the bobber and hold the rod longitudinally in place.

The rod assembly is interengaged to respective sections of a fishing line by engaging those sections with the tip eyelet holes 259 and 261. As previously described, when a fish strikes a baited hook at the end of the leader, the tensile forces exerted by this strike and the subsequent retrieval of the fish are transmitted through the strengthening rod. This improves the structural integrity of the device significantly.

In operation, bobber 210 is assembled by installing rod assembly 290, control unit 250 and jet drive assemblies 201 and 203 in their respective receptacles as previously described. A battery is installed in battery chamber 295 and connected to wiring attached to the control unit and jet drive units. The bobber is then operated by transmitting remote wireless signals from the transmitter to the receiver of the control unit. A microprocessor of the control unit directs the jet propulsion units to operate so that the bobber is directed to and maintained in a desired fishing target area. In particular, the microprocessor directs motors M to operate propellers 238 at desired speeds. One of the propellers can be operated at a slower speed or deactivated entirely to effect reliable turning of the bobber. In the version of FIGS. 7-19 the remote transmitter typically employs a single joystick for controlling the jet drive units. This joystick is manipulated to operate the respective jet drive units at selected speeds for both propelling and turning the bobber. A separate directional control, as depicted in FIG. 1, is eliminated. The propulsion control joystick employs a self-centering feature wherein the joystick reverts automatically to a centered position and in this state the power to the propulsion devices is cut off when the joystick is released. The bobber effectively maintains the supported bait and hook at a selected target area until the fish has struck the hook. After a strike, the fishermen may then retrieve the bobber, remaining tackle and hooked fish as previously described. Once again, the connecting rod dissipates the tensile forces accompanying the fish strike and retrieval so that damage to the shell is resisted.

The control unit may be further programmed to activate and deactivate LED 273 as desired. Transparent closure 239 effectively forms a window that transmits light from the interior of the bobber when LED 273 is activated. This provides at least a couple of significant benefits. The light transmitted by LED assists the fishermen in locating and properly positioning the bobber at dusk, in the evening, or at other times when visibility is limited or restricted (e.g. during overcast or inclement weather conditions). Light from LED 273 projecting through closure 239 also serves to attract fish and thereby helps to improve the fishermen's catch. The bobber shell 212 is otherwise opaque so that viewing through the shell into the interior of the shell is obscured. As a result, fish are not intimated and scared away by the internal components of the bobber.

The jet drive version of the bobber provides for a number of additional benefits. The electronic components as well as the jet drive units can be readily removed and replaced as required. As a result, when those units malfunction or wear out, they can be simply and quickly replaced without having to replace the entire bobber. The sealed receptacles and components used by the shell further prolong the effective life of the product.

The version depicted in FIGS. 7-19 allows the hook and leader to be attached conveniently and operated at either the forward or rearward end of the bobber. Both the leading and trailing ends are hydrodynamically streamlined and can be moved and retrieved through the water with equal effectiveness in either direction.

The locking system utilized in the version of FIGS. 7-19 pulls the jet drive and control unit receptacles securely closed. This feature, as well as the improved and effective sealing utilized by the bobber further help to resist water damage and prolong the life of the device.

From the foregoing it may be seen that the apparatus of this invention provides for a remote controlled fishing line bobber and, more particularly, to a boat shaped bobber that is remotely controlled to maintain a suspended fish hook, bait and other components of a fishing rig in a desired target area so that improved fishing is achieved. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A remote controlled fishing line bobber for use in combination with a fishing rod having a first section of fishing line retrievably connected thereto and a discrete and discontinuous second section of fishing line having a fishing hook attached thereto, which discontinuous first and second sections of fishing line are not unitarily interconnected to one another in one continuous piece, said bobber comprising:
   an elongate bobber shell floatable in a body of water and including an interior compartment;
   an elongate connecting rod mounted to said bobber shell and extending longitudinally through said compartment from a leading end to a trailing end of said bobber shell, said bobber shell having a pair of aligned orifices for receiving respective ends of said connecting rod and said connecting rod carrying a pair of attachment components disposed at respective ends of said connecting rod and exteriorly of said shell for respectively joining said connecting rod to respective the discrete and discontinuous segments first and second sections of fishing line;
   a battery powered propulsion device mounted in a lower half portion of said shell interior compartment, wherein said propulsion device includes a jet drive unit removably and replaceably received in a jet drive receptacle formed longitudinally through said shell in said lower half portion; and
   means mounted in said compartment for receiving wireless propulsion signals from a remote control unit and directing said propulsion device to drive said bobber through the water in accordance with the transmitted signals, said bobber including a center of mass located in said compartment below said connecting rod such that when said bobber is floated in a body of water, said bobber is self-righting and said connecting rod assumes a substantially horizontal orientation; said connection rod relieving tensile force exerted along said first and second sections of fishing line from said bobber shell.

2. The apparatus of claim 1 in which said shell is hydrodynamically streamlined in opposing directions from said leading end and said trailing end of said shell respectively.

3. The apparatus of claim 1 in which said jet drive unit includes a propeller and a motor for selectively operating said propeller in response to signals from said means for receiving and directing, said jet drive unit further including a housing for enclosing said motor and said propeller, said housing having a water inlet and a water discharge port for transmitting water through said jet drive unit in response to operation of said propeller.

4. The apparatus of claim 3 further including an inlet screen engaged with said jet drive unit for transmitting water through said inlet and restricting fishing line and debris from entering said jet drive unit through said inlet.

5. The apparatus of claim 4 further including a jet drive mounting cover for holding said jet drive unit within said jet drive receptacle and holding said screen over said inlet of said jet drive unit.

6. The apparatus of claim 5 in which said means for receiving and directing include an electronic control unit removably and replaceably received in a control unit receptacle formed within an upper half portion of said interior compartment of said shell.

7. The apparatus of claim 6 further including a control unit closure sealably engageable with said shell to cover said control unit receptacle, said closure being selectively disengaged from said shell to open said control unit receptacle and permit selective installation, removal and replacement of said control unit.

8. The apparatus of claim 7 further including a light unit operably mounted within said control unit receptacle and connected to said control unit, said light unit for being selectively activated in response to corresponding control signals from said control unit, said control unit closure including a window for transmitting light from said light unit therethrough to selectively illuminate said bobber apparatus and attract fish.

9. The apparatus of claim 7 further including a battery compartment formed longitudinally through said shell for accommodating a battery therein, which battery supplies power to said propulsion device and said control unit.

10. The apparatus of claim 9 further including a plug that is sealably and removably interengageable with said battery compartment, said plug being removed from said battery compartment to selectively install, remove and replace said battery.

11. The apparatus of claim 10 further including a locking component interposed between said plug and said shell for locking said control unit closure closed and holding said jet drive mounting covers and said jet drive unit within said jet drive receptacle when said plug is sealably engaged with said battery compartment.

12. The apparatus of 11 in which said locking component includes a detent for releasably engaging a corresponding locking slot in said control unit closure to lock said closure in a closed condition against said control unit receptacle, said locking component further including locking tab for engaging a corresponding recess in said jet drive mounting cover to retain said cover and said jet drive unit within said jet drive receptacle.

13. The apparatus of claim 1 in which said shell is completely opaque such that viewing of the interior compartment through said shell is blocked.

14. The apparatus of claim 1 in which said jet drive unit includes a pair of jet drive units removably and replaceably received in respective, substantially parallel, elongate jet drive receptacles formed longitudinally through said shell in said lower half portion of said shell.

15. The apparatus of claim 14 in which said means for receiving and directing selectively operates said jet drive units at different speeds to turn said apparatus in the water.

\* \* \* \* \*